United States Patent [19]

Kodama et al.

[11] Patent Number: 4,579,888

[45] Date of Patent: Apr. 1, 1986

[54] AQUEOUS RESIN DISPERSION

[75] Inventors: Yasushi Kodama, Sayama; Kiyoshi Okugami, Saitama; Hitoshi Muroi, Tokyo; Atsuhiro Yamamoto, Tokorozawa, all of Japan

[73] Assignee: Toyo Ink Manufacturing Co., Ltd., Tokyo, Japan

[21] Appl. No.: 718,139

[22] Filed: Apr. 1, 1985

[30] Foreign Application Priority Data

Apr. 10, 1984 [JP] Japan .................................. 59-70133
Apr. 10, 1984 [JP] Japan .................................. 59-70134

[51] Int. Cl.$^4$ ........................ C09D 3/56; C09D 3/58; C09D 5/02; C09D 11/10
[52] U.S. Cl. .................... 523/412; 523/100; 106/20
[58] Field of Search ........................................ 523/412

[56] References Cited

U.S. PATENT DOCUMENTS 4,383,059  5/1983  Brook et al. .................... 523/412
4,444,923  4/1984  McCarty ............................ 523/412
4,458,040  7/1984  Suzuki et al. ...................... 523/412

FOREIGN PATENT DOCUMENTS 3006175    8/1981  Fed. Rep. of Germany ...... 523/412
56-109243  8/1981  Japan .................................. 523/412
59-11369   1/1984  Japan .................................. 523/412

Primary Examiner—Ronald W. Griffin
Attorney, Agent, or Firm—Bucknam and Archer

[57] ABSTRACT

An aqueous resin dispersion prepared by dispersing in an aqueous medium in the presence of ammonia or an amine a composite resin composition comprising carboxylic groups in an excessive amount and a reaction product obtained by at least partially reacting a specific acrylic resin (A), a specific aromatic epoxy resin (B) and a specific phenolic resin (C), characterized in that the acrylic resin (A) and the aromatic epoxy resin (B) are at least partially reacted with each other, and the phenolic resin (C) is pre-condensed with the acrylic resin (A) or aromatic epoxy resin (B).

15 Claims, No Drawings

AQUEOUS RESIN DISPERSION

BACKGROUND OF THE INVENTION

1. Field of the Invention

This invention relates to coating compositions and more particularly, to aqueous resin dispersions which are useful as baking paints for metals, particularly for interior surfaces of cans, and are able to form excellent films adapted for these purposes.

2. Description of the Prior Art

Conventional can coating paints and corrosion-resistant paints have been heretofore desired to be switched over to aqueous systems from the standpoint of resource and energy savings, and environmental pollution. In aqueous paints, epoxy resins have been chiefly investigated as in the case of solvent-type paints. In fact, a number of methods of dispersing epoxy resins in water were proposed.

For instance, surface active agents are used to disperse epoxy resins in water. For this purpose, two methods are known including a method using anionic surface active agents and a method using nonionic surface active agents. In the former method, oxysilane rings open during emulsification and storage with a lowering of reactivity. This leads to deterioration of the film-forming property. In some case, thickening and gelling problems may take place. In the latter method, fairly large amounts of surface active agents are contained in the system in order to improve dispersability and storage stability, so that the surface active agents tend to give adverse influences on chemical and mechanical properties of a formed film.

To solve the above problems, there have been proposed a variety of self-emulsifiable epoxy resins in which epoxy resins are modified with acrylic resins to introduce emulsifiable segments into the epoxy resin molecules.

For example, Japanese Laid-open Patent Application No. 53-1228 describes a grafted epoxy resin which is obtained by polymerizing a monomer mixture containing a carboxylic acid monomer in an epoxy resin by the use of a free radical generator such as benzoyl peroxide. This grafted epoxy resins is stably dispersed in an aqueous medium containing bases.

Japanese Laid-open Patent Application No. 56-43362 described a water-bearing coating composition which comprises a reaction product of an epoxy resin, a carboxyl group-containing polymer and a tertiary amine. Moreover, Japanese Laid-open Patent Application Nos. 53-14963, 55-9433 and 58-40363 disclose that partial reaction products, in excess of carboxyl groups, which are obtained by reaction between acrylic resins and relatively high molecular weight aromatic epoxy resins are stably dispersed in aqueous medium in the presence of ammonia or amines. In addition, Japanese Laid-open Patent Application Nos. 55-3481 and 55-3482 describe self-emulsifiable epoxy ester copolymers, i.e. carboxyl group-bearing function polymers are esterified with epoxy resins in the presence of amine esterification catalysts to obtain resins which are substantially free of any oxirane group, and the thus obtained resins are self-emulsified in water with the aid of bases.

Japanese Laid-open Patent Application Nos. 57-105418 and 58-198513 disclose aqueous dispersion compositions which are obtained by polymerizing low molecular weight compounds, which are produced by partial reaction between aromatic epoxy resins and (meth)acrylic acid and which have epoxy groups and acryroyl groups in one molecule thereof, and a monomer mixture comprising acrylic acid or methacrylic acid, and neutralizing the resulting copolymer with basic compounds.

The self-emulsifiable epoxy resins obtained by the above process has no surface active agent in the paints, strong films are obtained from the paints. If a higher curing speed is needed, water-soluble amino resins or phenolic resins may be added to these paints. When used in an appropriate amount, water-soluble amino resins serve to improve the curing speed without lowering physical properties of the film. In some case, because the crosslinking density increases, a suitable degree of film hardness can be obtained. However, when the paint comprising a water-soluble amino resin is applied for interior surface coating of cans, a serious problem arises in that low molecular weight compounds derived from the amino resin are dissolved out in the content of a can by thermal sterilization treatment. Addition of phenolic resins to aqueous dispersion compositions of the reaction products of aromatic epoxy resins and acrylic resins are described, for example, in the afore-indicated Japanese Laid-open Patent Application Nos. 55-3481, 55-3482, 56-43362 and 58-3482. However, the dispersion compositions comprising ordinary phenolic resins are still unsatisfactory in rapid curability.

Japanese Laid-open Patent Application No. 57-182361 teaches a paint which consists of a resol-type phenolic resin, which essentially contains a phenol dimer component, an alcoholic hydroxyl group-bearing material, and organic solvents.

SUMMARY OF THE INVENTION

It is an object of the invention to provide aqueous resin dispersions which overcome the problem of the curability or hardenability of known aromatic epoxy resin-acrylic resin compositions.

It is another object of the invention to provide aqueous resin dispersions which exhibit high adhesion to metals and can be applied as paints for metals.

According to the invention, there is provided an aqueous resin dispersion comprising a composite resin composition which is excessive of carboxyl groups and comprises a combination of an acrylic resin (A) comprising 12 to 70 wt% of monobasic carboxylic acid units as an essential component, an aromatic epoxy resin (B) having, on average, 1.1 to 2.0 epoxy groups in one molecule thereof, and a phenolic resin (C) whose principal component is represented by the following formula

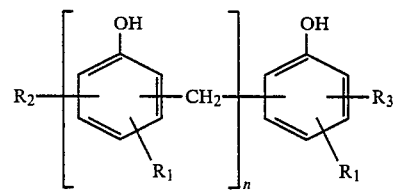

in which $R_1$ represents a hydrogen atom or an alkyl group having from 1 to 12 carbon atoms, $R_2$ and $R_3$ each represent a hydrogen atom or a methylol group, and n is an integer of from 1 to 3, the composite resin composition being dispersed in an aqueous medium by means of ammonia or an amine in an amount sufficient to allow the resulting final composition to have a pH of 4–11.

The composite resin composition used in the invention is obtained by chemically combining or interacting an acrylic resin (A) which is obtained by copolymerizing a copolymerizable monomer mixture containing 12 to 70 wt% of a monobasic carboxylic acid monomer, the aromatic epoxy resin (B), and the phenolic resin (C), both defined above.

Alternatively, the composite resin composition may be obtained by mixing a partial reaction product (D) between an acrylic resin (A) having 12 to 70 wt% of monobasic carboxylic acid units as the essential component and an aromatic epoxy resin (B) having, on average, 1.1 to 2.0 epoxy groups in one molecule thereof, with the phenolic resin (C) defined before.

DETAILED DESCRIPTION OF THE INVENTION

The acrylic resins (A) are obtained by copolymerizing a monomer mixture of a monobasic carboxylic acid monomer, such as acrylic acid or methacrylic acid, and other copolymerizable monomers by the use of an ordinary radical polymerization initiator, such as azobisisobutyronitrile or benzoyl peroxide, at a temperature of from 80° to 150° C. The copolymerizable monomers may be selected from one or more of the following monomers including acrylic esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate, and dodecyl acrylate; methacrylic esters such as methyl methacrylate, propyl methacrylate, n-butyl methacrylate, isobutyl methacrylate, n-amyl methacrylate, n-hexyl methacrylate, n-octyl methacrylate, 2-ethylhexyl methacrylate, decyl methacrylate, and dodecyl methacrylate; styrene monomers such as styrene, vinyltoluene, 2-methylstyrene, t-butylstyrene, and chlorostyrene; hydroxy group-containing monomers such as hydroxypropyl acrylate, hydroxyethyl methacrylate, and hydroxypropyl methacrylate; N-substituted (meth)acrylic monomers such as N-methylol(meth)acrylamide and N-butoxy(meth)acrylamide; epoxy group-containing monomers such as glycidyl acrylate and glycidyl methacrylate; and acrylonitrile.

The amount of the monobasic carboxylic acid should be in the range of from 12 to 70 wt% of the total amount of the monomer mixture. Less amounts are unfavorable because of poor dispersion stability of the resin in aqueous medium, adhesiveness of a coated film to metals, solvent resistance of the film, and flavor retentivity on application to interior surfaces of a can. Larger amounts are also unfavorable because of becoming extremely high viscosity of a solution during polymerization and the resulting film is poor in water resistance and boil proofing when applied to interior surfaces of a can.

The weight average molecular weight of the acrylic resin (A) is preferred to be in the range of from 3,000 to 80,000. If the weight average molecular weight is smaller than 3,000, the crosslink density of film increases with troubles in flexibility. When the weight average molecular weight is larger than 40,000 and particularly 80,000, there is the tendency toward gellation upon reaction with aromatic epoxy resin (B).

The aromatic epoxy resin (B) is a product obtained by condensing bisphenol A and an epihalohydrin in the presence of an alkali catalyst, and has 1.1 to 2.0 epoxy groups, on average, in one molecule thereof. The number average molecular weight is generally not smaller than 300, preferably not smaller than 900. Commercial products available from Shell Chem. Inc., under designations of Epikote 828, Epikote 1001, Epikote 1004, Epikote 1007 and Epikote 1009 are usable as the aromatic epoxy resin (B). Moreover, the aromatic epoxy resin (B) may be modified, at the epoxy groups thereof, with dehydrate castor oil, plant oil fatty acids such as soybean oil fatty acids and coconut oil fatty acids, or bisphenol A.

The phenolic resin (C) used in the present invention comprises, as the principal component, a resin of the following formula

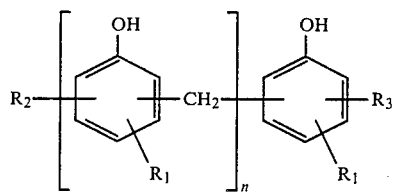

in which $R_1$ represents a hydrogen atom or an alkyl group having from 1 to 12 carbon atoms, $R_2$ and $R_3$ each represent a hydrogen atom or a methylol group, and n is an integer of from 1 to 3.

The phenolic resin (C) may be prepared by any known methods including a method in which an alkyl phenol is subjected to addition condensation to formaldehyde in the presence of an alkali catalyst, or a method which comprises producing a dimethylol compound of an alkylphenol at a relatively low temperature of from room temperature to approximately 60° C. in high yield and subjecting the dimethylol compound to condensation reaction.

Alkylphenols include, for example, p-cresol, o-cresol, p-ethylphenol, p-tert-butylphenyl, p-octylphenol, and p-nonylphenol. The reaction conditions for the phenolic resin may be arbitrarily selected within the range of satisfying the above requirement. As a matter of course, the phenolic resin may be a single phenolic resin product which is obtained under reaction conditions enabling phenolic resin (C) of the formula, where n is a specific value, to be obtained in high yield. Alternatively, different phenolic resins, in which different alkylphenols are used or different values of n are used, may be prepared and mixed for use as the phenolic resin (C). Aside from the phenolic resin (C), other known phenolic resins may be used in combination. The phenolic resins used for these purposes include resol-type phenolic resins or novolac-type phenolic resins ordinarily used in known epoxy-phenolic resin paints. These phenolic resins may be used in an amount not impeding the characteristics of the phenolic resin (C), e.g. in an amount not exceeding approximately 50 wt%.

The acrylic resin-epoxy resin partial reaction product may be prepared in various ways as is shown below.

The acrylic resin-epoxy resin partial reaction product (D) is prepared by partial reaction between the acrylic resin (A) obtained by copolymerizing a copolymerizable monomer mixture comprising 12 to 70 wt% of a monobasic carboxylic acid monomer and the aromatic epoxy resin (B) having, on average, 1.1 to 20 epoxy groups in one molecule thereof. For the preparation of the partial reaction product, it is convenient to conduct the reaction in a hydrophilic organic solvent, such as ethylene glycol monobutyl ether, in the presence of ammonia or an amine described later under agitation at a temperature of from 60° to 170° C. for 10 minutes to 2 hours. The reaction control can be checked by measurement of an oxirane content by percent and measurement of an increasing viscosity, or through the molecular weight distribution chart of gel permeation chromatography (GPC).

If relatively high boiling solvents such as, for example, hexyl cellosolve, butyl cellosolve, methyl cellosolve acetate are used, the partial reaction product between acrylic resin (A) and aromatic epoxy resin (B) can be obtained by reaction in the solvent at a temperature of 120° C. or over without coexistence of an esterification catalyst such as ammonia or an amine.

The reaction can be controlled by measurement of an oxirane content by percent. A known method of measuring a oxirane content is a method in which a predetermined amount of a tetraethylammonium bromide solution is added to a solution of a sample in solvent and titrated with standardized perchloric acid. However, this method is disadvantageous, when applied to the partial reaction product, in that the end point of the titration becomes frequently unclear presumably due to the impeding action of excessively coexisting carboxyl groups. The quantitative determination using proton NMR is simple and favorable. In the proton NMR, the methylene in the oxirane group is between 2.5 and 2.9 ppm and the peak area of the methylene is traced during the reaction. This area is compared with a peak area, for example, of proton of the benzene ring in the aromatic epoxy resin from which a reduction rate of the oxirane group is calculated. It is to be noted that if a monomer having the benzene ring is used to prepare the acrylic resin, this benzene ring should be taken in account for the calculation. The reduction rate of the oxirane group at the reaction stage is in the range of from 5 to 95%, preferably from 30 to 70%, based on the initial content of oxygen groups in a starting aromatic epoxy resin. If the reduction rate is less than 5%, there is the tendency that the resulting reaction product between acrylic resin and aromatic epoxy resin cannot be satisfactorily self-emulsified in aqueous medium and may separate during storage. The resin obtained as having an oxirane content of from 30 to 70% exhibits good coating performance.

Alternatively, the partial reaction product (D) used in the present invention may be prepared by polymerizing a copolymerizable monomer mixture comprising 12 to 70 wt% of a monobasic carboxylic acid monomer along with aromatic epoxy resin (B) by the use of a relatively great amount of an organic peroxide such as benzoyl peroxide. In this case, there is obtained the aromatic epoxy resin grafted with an acrylic resin.

Still alternatively, the partial reaction product (D) may be prepared by polymerizing a product, which is obtained by reaction between an epoxy resin (B) and a monocarboxylic acid monomer in the presence of a base and has both epoxy groups and double bonds, and a copolymerizable monomer mixture comprising B 12 to 70 wt% of a monobasic carboxylic acid monomer by the use of a radical polymerization initiator.

The ratio, as solids, between the acrylic resin (A) and the aromatic epoxy resin (B) is in the range of from 1:1 to 1:6.

In the practice of the invention, a pre-condensate between the acrylic resin (A) or the aromatic epoxy resin (B) and the phenolic resin (C) may be used. The pre-condensate is obtained by reaction in a hydrophilic solvent at a temperature of from 5° to 150° C. for 10 minutes to 3 hours.

The composite resin composition of the invention may be obtained by various techniques. For instance, (a) the pre-condensate between aromatic epoxy resin (B) having epoxy groups and phenolic resin (C) is reacted with an acrylic resin (A) in the presence of ammonia or an amine; (b) the partial reaction product (D) between the acrylic resin (A) and aromatic epoxy resin (B), and phenolic resin (C) are subjected to preliminary condensation at a temperature of from 50° to 150° C. for 10 minutes to 3 hours; (c) a copolymerizable monomer mixture comprising from 12 to 70 wt% of a monobasic carboxylic acid monomer is polymerized in a pre-condensate of aromatic epoxy resin (B) and phenolic resin (C) by the use of an organic peroxide, such as benzoyl peroxide, in relatively large amounts; and (d) a resin, which is obtained by reaction between aromatic epoxy resin (B) and a monobasic carboxylic acid monomer in the presence of an amine and has epoxy groups and double bonds, and phenolic resin (C) are reacted, followed by graft-polymerizing a copolymerizable monomer mixture comprising 12 to 70 wt% of a monobasic carboxylic acid monomer by the use of a radical polymerization initiator. The above reactions (a) through (d) are preferably conducted in hydrophilic solvents.

The composite resin composition of the invention may be also obtained by merely mixing acrylic resin-aromatic epoxy resin partial reaction product (D) and phenolic resin (C).

The content of the phenolic resin (C) in the composite resin composition is in the range of from 2 to 40 wt% of the total resins. Less amounts do not satisfactorily contribute to the curing rate, whereas larger amounts tend to lower physical properties of film such as flexibility.

In the practice of the invention, an aqueous resin composition is readily obtained by adding ammonia or an amine to the composite resin composition in an amount sufficient to make the pH of a final composition at 4 to 11, and dispersing the composition to an aqueous medium. If solvents which have high boiling point are used in the preceding step, it is preferable to remove the solvents under reduced pressure prior to the dispersion.

Examples of the amines include alkylamines such as trimethylamine, triethylamine and butyl amine, alcoholamines such as 2-dimethylaminoethanol, diethanolamine, triethanolamine and aminomethylpropanol, and morpholine. Polyamines such as ethylenediamine and diethylenetriamine may be also used.

The aqueous medium used in the present invention means water alone or mixtures of water with hydrophilic organic solvents comprising 10 wt% or more of water. The hydrophilic organic solvents are, for example, alkyl alcohols such as methanol, ethanol, n-propanol, isopropanol, n-butanol, sec-butanol, tert-butanol and isobutanol, ether alcohols such as methyl cellosolve, ethyl cellosolve, propyl cellosolve, butyl cellosolve, methyl carbitol and ethyl carbitol, ether esters such as methyl cellosolve acetate and ethyl cellosolve acetate, and dioxane, dimethylformamide and diacetone alcohol.

The aqueous resin dispersion of the invention exhibits good curability because of the presence of readily curable phenolic resins, and the resulting film has a good extraction characteristic. The film has very high adhesion to metals.

The aqueous resin dispersion of the invention may be used as paints by adding surfactants, defoamers and the like, if necessary.

Substrates to which the aqueous resin dispersion is applied are metal sheets such as non-treated steel plates, treated steel plates, galvanized iron plates, and tin plates. The coating methods are preferably spray coatings such as air spray coating, airless spray coating and electrostatic spray coating. Dip coating, roll coater coating and electrodeposition coating may also be used. The baking conditions are as follows: a temperature ranges from 150° to 230° C. and a time ranges from 2 to 30 minutes.

The aqueous resin dispersion of the invention may further comprise appropriate rust preventives, pigments and fillers for use as rust preventive primers, printing inks and rust preventive paints.

The present invention is particularly described by way of examples, in which parts and percent are by weight unless otherwise indicated.

EXAMPLE 1

Preparation of Phenolic Resin Solution 136 parts by weight of p-tert-butylphenol, 162 parts of an aqueous 37% formaldehyde solution, and 160 parts by weight of an aqueous 25% sodium hydroxide solution were charged into a flask and reacted at 50° C. for 3 hours, followed by neutralization with hydrochloric acid and separating water. After the separation of water, 250 parts of p-tert-butylphenol, 3.7 parts of 10% hydrochloric acid and 250 parts of water were added and agitated for about 30 minutes. At the time when generation of heat completed, 160 parts of a 25% sodium hydroxide solution and 120 parts of an aqueous 37% formaldehyde solution were added, followed by reaction at 50° C. for 3 hours, neutralization with hydrochloric acid and separation of the aqueous phase. Washing with water and separation of water was repeated three more times, followed by dissolving in a mixed solvent of n-butanol/xylene=1/1, thereby obtaining a 60% phenolic resin solution. The thus obtained resin was analyzed by GPC, revealing that it contained 91% of a dimethylol compound of p-tert-butylphenol trimer and small amounts of dimethylol compounds of the monomer, dimer and tetramer.

In the GPC analysis, there were used four columns, connected in series, including two A-801 columns, one A-803 column and one A-804 column of Shodex GPC A-800 series available from Showa Denko Co., Ltd.

The measurement was carried out under conditions ordinarily used for these purposes. It will be noted that the GPC analysis was effected in the same manner as described above in the following examples and comparative examples.

Preparation of Acrylic Resin Solution

| | |
|---|---|
| Styrene | 300.0 parts |
| Ethyl acrylate | 210.0 |
| Methacrylic acid | 90.0 |
| Ethylene glycol monobutyl ether | 388.0 |
| Benzoyl peroxide | 12.0 |

A quarter of the mixture of the above formulation was charged into a four-neck flask which had been substituted with nitrogen gas, and heated to 80° to 90° C., followed by gradually dropping the residue while keeping the temperature under agitation. After completion of the dropping, the mixture was agitated at the same temperature for further 2 hours and cooled to obtain a carboxyl group-containing resin solution having an acid value of 93 (calculated as solids herein and whenever it appears hereinafter), a solid content of 59.7%, and a viscosity of 4100 cps. (at 25° C., viscosities, appearing hereinafter, being all measured at 25° C.)

Preparation of Epoxy Resin Solution

| | |
|---|---|
| Epikote 1007 (trade mark registered by Shell Chem. Inc.) | 500 parts |
| Ethylene glycol monobutyl ether | 333.3 |

The mixture of the above formulation was charged into a four-neck flask substituted with nitrogen gas and gradually heated until the inner temperature reached 100° C., followed by agitating for 1 hour for complete dissolution and cooling down to 80° C., thereby obtaining an epoxy resin solution having a solid content of 60%.

Preparation of Aqueous Dispersion

| | | |
|---|---|---|
| (1) | Above-obtained acrylic resin solution | 50 parts |
| (2) | Above-obtained epoxy resin solution | 100 |
| (3) | Above-obtained phenolic resin solution | 30 |
| (4) | 2-Dimethylaminoethanol | 4.8 |
| (5) | Ion-exchanged water | 355.2 |

(1), (2) and (3) were charged into a four-neck flask and reacted at 100° C. for 2 hours while agitating. According to the GPC measurement prior to and after the reaction, it was confirmed that the epoxy resin and the phenolic resin were partly combined together. The temperature of the reaction system was lowered down to 80° C., to which (4) was added for reaction for 30 minutes and cooled. By the GPC measurement prior to and after the reaction, the reaction between the acrylic resin and the epoxy resin was confirmed. While the reaction system was further agitated, (5) was gradually added, whereupon a milky dispersion having a solid content of 20% and a viscosity of 385 cps. was obtained. The thus obtained dispersion was stored at 50° C. for 3 months without any abnormality.

EXAMPLE 2

Preparation of Phenolic Resin Solution 108 parts of p-cresol, 162 parts of an aqueous 37% formaldehyde solution, and 160 parts of an aqueous 25% sodium hydroxide solution were charged into a flask and reacted at 50° C. for 2 hours, followed by heating the mixture up to 100° C. at which further reaction was effected for 1 hour. The reaction product was neutralized with hydrochloric acid and subjected to extraction with a mixed solvent of n-butanol/xylene=1/1 to obtain a 60% phenolic resin solution. The analysis by GPC revealed that over 90% of the reaction product after 2 hours was a dimethylol compound of p-cresol and that the final product was composed of 9% of a dimethylol compound of p-cresol, 36% of a dimethylol compound of the dimer, 41% of a dimethylol compound of the trimer, 9% of a dimethylol compound of the tetramer, dimethylol compounds of the pentamer and higher oligomers.

Acrylic resins and epoxy resin solutions were prepared in the same manner as in Example 1. An aqueous dispersion was prepared in the same manner as in Example 1 except that the phenolic resin solution was replaced by the solution obtained above. The resulting dispersion has a solid content of 20% and a viscosity of 450 cps. When the dispersion was stored at 50° C. for 3 months, no abnormality was observed.

EXAMPLE 3

Preparation of Aqueous Resin Dispersion

| (1) Epoxy resin solution of Example 1 | 150 parts |
|---|---|
| (2) Butyl cellosolve | 30 |
| (3) Methacrylic acid | 30 |
| (4) Styrene | 18 |
| (5) Ethyl acrylate | 2 |
| (6) Benzoyl peroxide | 3.5 |
| (7) Phenolic resin solution of Example 2 | 30 |
| (8) 2-Dimethylaminoethanol | 4.8 |
| (9) Ion-exchanged water | 560 |

(1) and (2) were charged into a four-neck flask and heated to 115° C. while agitating. Subsequently, a mixture of (3) through (6) was dropped in 1 hour and subjected to reaction for 2 hours at 115° C., followed by adding (7) further reaction for 2 hours under agitation. After cooling, (8) was added and then (9) was gradually added, thereby obtaining a stable aqueous dispersion.

EXAMPLE 4

Preparation of Phenolic Resin Solution 460 parts of an aqueous sodium hydroxide solution into a flask, to which 128 parts of 92% paraformaldehyde was added, for dissolution, portion by portion under agitation, followed by charging 108 parts of p-cresol for reaction at 50° C. for 2 hours and then further reaction at 70° C. for 6 hours. After neutralization with hydrochloric acid and washing with water, the resulting slurry was extracted with n-butanol to obtain a 30% phenolic resin solution. The analysis by GPC revealed that the product was composed of 2% of a dimethylol compound of p-cresol, 90% of a dimethylol compound of the dimer, 5% of a dimethylol compound of the trimer, and 3% of dimethylol compounds of the tetramer and higher oligomers.

Preparation of Aqueous Dispersion

| (1) Acrylic resin solution of Example 1 | 50 parts |
|---|---|
| (2) Epoxy resin solution of Example 1 | 100 |
| (3) 2-Dimethylaminoethanol | 4.8 |
| (4) Above phenolic resin solution | 60 |
| (5) Ion-exchanged water | 325.2 |

(1) and (2) were charged into a four-neck flask, to which (3) was added under agitation and neutralized, followed by heating up to 80° C. for reaction for 30 minutes and cooling. According to the GPC measurement prior to and after the reaction, it was confirmed that the acrylic resin and the epoxy resin were combined. After cooling, (4) was added and agitated to obtain a uniform solution, followed by gradually adding (5) under agitation, thereby obtaining a milky dispersion having a solid content of 20% and a viscosity of 425 cps. The thus obtained dispersion was stored at 50° C. for 3 months without any abnormality.

EXAMPLE 5

An acrylic resin solution, epoxy resin solution, and phenolic resin solution were, respectively, prepared in the same manner as in Example 1 and 4.

Preparation of Aqueous Dispersion

| (1) Acrylic resin solution of Example 1 | 50 parts |
|---|---|
| (2) Epoxy resin solution of Example 1 | 100 |
| (3) 2-Dimethylaminoethanol | 4.8 |
| (4) Phenolic resin solution of Example 4 | 60 |
| (5) Ion-exchanged water | 325.2 |

(1), (2) and (3) were charged into a four-neck flask and heated to 80° C. for reaction for 30 minutes. The GPC measurement prior to and after the reaction revealed that the reaction between the epoxy resin and the acrylic resin was confirmed.

Thereafter, (4) was added to the system and reacted at 80° C. for 30 minutes, followed by gradual addition of (5), thereby obtaining a milky dispersion having a solid content of 20% and a viscosity of 850 cps. The thus obtained dispersion was stored at 50° C. for 3 months without any abnormality.

EXAMPLE 6

Preparation of Acrylic Resin

| (1) Methylcellosolve acetate | 1000 parts |
|---|---|
| (2) Styrene | 180.6 |
| (3) Ethyl acrylate | 86 |
| (4) Methacrylic acid | 163 |
| (5) Catalyst for polymerization, benzoyl peroxide | 6.4 |

A four-neck flask equipped with a reflux condenser, a monomer tank, a monomer flow regulator, a thermometer, and an agitator was substituted with nitrogen, into which (1) was charged. A monomer mixture of (2) through (4) and the polymerization catalyst (5) were placed and mixed in the monomer tank, and the quarter of the mixture was gradually added to (1) charged in the flask and heated to keep the temperature at 105° C. The remaining mixed monomers were added over 2 hours. After completion of the dropping, agitation was continued for 2 hours, followed by cooling down to room temperature. The resulting solution was an acrylic resin solution having a solid content of 30.1%, a viscosity of U-V, determined at 25° C. by means of the Gardner bubble viscometer, and an acid value of 247 mg KOH/g, calculated as solids.

Preparation of Solution of An Epxoy Resin And Acrylic Resin Partial Reaction Product

| (6) Methylcellosolve acetate | 2100 parts |
|---|---|
| (7) Epikote 1009 | 900 |
| (8) Above acrylic resin solution | 1000 |

A four-neck flask, equipped with an agitator, a reflux condenser, a thermometer and a solvent-removing device, was substituted with nitrogen, into which (6) and (7) were charged, followed by heating and agitating the reaction system. After complete dissolution of the epoxy resin, (8) was added and heated to 135° C., followed by continuing agitation over 8 hours while keeping the temperature, thereby obtaining a partial reaction product between the epoxy resin and the acrylic resin. During the reaction, the reaction mixture was periodically sampled to check a viscosity thereof. The solution obtained after completion of the reaction had a solid content of 30.1% and a viscosity of U-V.

Thereafter, part of the solvent was removed under reduced pressure to an extent of a solid content of 60%.

Preparation of Aqueous Dispersion

| (9) Above-obtained epoxy resin and acrylic resin partial reaction product | 500 parts |
|---|---|
| (10) Phenolic resin solution of Example 4 | 100 |
| (11) 25% ammoniacal solution | 19.5 |
| (12) Ion-exchanged water | 1180.5 |

(9) and (10) were charged into a four-neck flask and heated under agitation for reaction at 100° C. for 3 hours, followed by cooling and adding (11) at 50° C. After agitation for 30 minutes, (12) was gradually added, thereby obtaining a yellowish milky dispersion having a solid content of 20% and a viscosity of 500 cps. The thus obtained dispersion was stored at 50° C. for 3 months with no abnormality.

EXAMPLE 7

Preparation of Epoxy Resin Solution

| (1) Epikote 1009 | 646 parts |
|---|---|
| (2) Ethylene glycol monobutyl ether | 349 |
| (3) Aqueous 10% NaOH solution | 1 |
| (4) Hydroquinone | 0.02 |
| (5) Methacrylic acid | 4 |

(1) and (2) were charged and agitated at 110° C. for 2 hours. After confirmation of the dissolution, the mixture was cooled. (3) was added to the mixture at 100° C., to which (5) was further added while heating. The reaction was conducted at 130° C. for 5 hours and was stopped when the acid value lowered to 0.3 mg KOH/g, followed by cooling and withdrawing the reaction product. The product had a number average molecular weight of 3800, an epoxy equivalent of 2750, an average number of epoxy groups of 1.38 per molecule, a solid content of 65%, and a viscosity at 50° C. of 80,000 cps.

Preparation of Aqueous Dispersion

| (6) Methyl ethyl ketone | 40 parts |
|---|---|
| (7) Above epoxy resin solution | 158.5 |
| (8) Styrene | 15.4 |
| (9) Ethyl acrylate | 18 |
| (10) Methacrylic acid | 18 |
| (11) Ethylene glycol monobutyl ether | 68.3 |
| (12) Azobisisobutyronitrile | 0.5 |
| (13) Azobisisobutyronitrile | 0.6 |
| (14) Phenolic resin solution of Example 4 | 57.3 |
| (15) Methyl ethyl ketone | 10 |
| (16) Aqueous 10% dimethylaminoethanol solution | 70 |
| (17) Ion-exchanged water | 543.4 |

(6) was charged into a flask and refluxed under heating conditions, to which a mixed solution of (7) through (12) was added portion by portion in 3 hours. After completion of the addition, the mixture was heated to 90° C., to which (13) was added, followed by further reaction. The reaction mixture was sampled, to which (14) was added at the time when the solid content reached 55% or over. The reaction was continued at 90° C. for 2 hours, followed by adding (15) while cooling and further adding (16) at 60° C. 15 minutes after the addition of (16), (17) was added portion by portion, thereby obtaining an aqueous dispersion having a solid content of 20% and a viscosity of 15 cps.

EXAMPLE 8

| (1) Acrylic resin solution of Example 1 | 50 parts |
|---|---|
| (2) Phenolic resin solution of Example 4 | 60 |
| (3) Epoxy resin solution of Example 1 | 100 |
| (4) 2-Dimethylaminoethanol | 4.8 |
| (5) Ion-exchanged water | 325.2 |

(1) and (2) were charged into a four-neck flask and reacted at 100° C. for 2 hours while agitating, followed by cooling to 80° C. and charging (3) and (4) for further agitation for 30 minutes. While agitating, (5) was gradually added, thereby obtaining a milky dispersion having a solid content of 20% and a viscosity of 350 cps. The thus obtained dispersion involved no abnormality when stored at 50° C. for 3 months.

EXAMPLE 9

| (1) Epoxy resin solution of Example 1 | 100 parts |
|---|---|
| (2) Phenolic resin solution of Example 4 | 60 |
| (3) Acrylic resin solution of Example 1 | 50 |
| (4) 2-Dimethylaminoethanol | 4.8 |
| (5) Ion-exchanged water | 325.2 |

(1) and (2) were charged into a four-neck flask and reacted at 100° C. for 2 hours while agitating. According to the GPC measurement prior to and after the reaction, it was confirmed that the epoxy resin and the phenolic resin were partially combined or reacted. The temperature of the solution was lowered down to 80° C., to which (3) and (4) were added for reaction for 30 minutes and cooled. The GPC measurement prior to and after the reaction revealed that the acrylic resin and the epoxy resin were combined together. (5) was gradually added to the reaction mixture while agitating, thereby obtaining a milky dispersion having a solid content of 20% and a viscosity of 400 cps. The dispersion was found to involve no abnormality when stored at 50° C. for 3 months.

COMPARATIVE EXAMPLE 1

Preparation of Aqueous Dispersion

| (1) Acrylic resin solution of Example 1 | 50 parts |
|---|---|
| (2) Epoxy resin solution of Example 1 | 100 |
| (3) 2-Dimethylaminoethanol | 4.8 |
| (4) Ion-exchanged water | 295.2 |

(1), (2) and (3) were charged into a four-neck flask and heated to 80° C., followed by reaction for 30 minutes and cooling. The measurement of GPC prior to and after the reaction revealed the reaction between the epoxy resin and the acrylic resin. (4) was gradually added while agitating, thereby obtaining a milky dispersion having a solid content of 20% and a viscosity of 362 cps. The thus obtained dispersion was stored at 50° C. for 3 months without any abnormality.

COMPARATIVE EXAMPLE 2

Preparation of Phenolic Resin Solution 136 parts of p-tert-butyl phenol, 162 parts of an aqueous 37% formaldehyde solution, and 80 parts of an aqueous 25% sodium hydroxide solution were charged into a flask, followed by reaction at 100° C. for 2.5 hours, neutralization with hydrochloric acid, and extraction with a mixed solvent of n-butanol/xylene=1/1, thereby obtaining a 60% phenolic resin solution. The analysis by GPC demonstrated that the product was composed of 8% of unreacted p-tert-butylphenol, 16% of a methylol compound of p-tert-butylphenol, 21% of methylol compounds of the dimer through tetramer, and 55% of methylol compounds of the pentamer and higher oligomers.

Preparation of Aqueous Dispersion

| | |
|---|---|
| (1) Acrylic resin solution of Example 1 | 50 parts |
| (2) Epoxy resin solution of Example 1 | 100 |
| (3) 2-Dimethylaminoethanol | 4.8 |
| (4) Above phenolic resin solution | 30 |
| (5) Ion-exchanged water | 355.2 |

(1) and (2) were charged into a four-neck flask, to which (3) was added while agitating, followed by neutralization, reaction at 80° C. for 30 minutes and cooling. The GPC measurement prior to and after the reaction revealed that the acrylic resin and the epoxy resin were partially combined. After cooling, (4) was added and agitated to obtain a uniform solution, to which (5) was further added under agitation, thereby obtaining a milky dispersion having a solid content of 20% and a viscosity of 405 cps. The thus obtained dispersion involved no abnormality when stored at 50° C. for 3 months.

COMPARATIVE EXAMPLE 3

Acrylic resin and epoxy resin solutions were prepared in the same manner as in Example 1. The preparation of an aqueous dispersion was effected in the same manner as in Comparative Example 2 except that there are used, instead of 30 parts of the phenolic resin solution, 22.5 parts of Cymel 25 (water-soluble amino resin, by Mitsui-Toatsu Chem. Co., Ltd., solid content of 80%).

The resulting aqueous dispersion had a solid content of 20% and a viscosity of 386 cps.

The aqueous dispersions obtained in Examples 1 to 9 and Comparative Example 1 to 3 were each applied onto a tin plate in a thickness of from 8 to 10 $\mu$m and baked at 165° C. and 200° C. for 5 minutes, thereby obtaining test panels. The test results of the respective resistant properties are shown in Table I. Moreover, each dispersion was sprayed over steel DI cans having an inner volume of 250 ml and baked at 165° C. and 200° C. for 5 minutes, to obtain interiorly coated cans for testing of the film properties. The results are shown in Table II.

The test methods in Tables I and II are illustrated as follows.

(1) Adherence: A coated film of the test panel was cut, by means of a knife, to give 11 lines×11 lines at right angles at intervals of about 1.5 mm to make a crosshatched area. A 24 mm wide cellophane adhesive tape was adhered to the crosshatched portion and peeled off strongly to count the number of non-peeled spots per the total spot number of 100.

(2) Retorting resistance: After treatment in water under conditions of 125° C. and 30 minutes, each film was judged visually and after a peeling test using a cellophane adhesive tape.

(3) Flexibility: A specific type of Du Pont Impact tester was provided and a folded sample was placed at the lower portion of the tester, and a 1 kg iron weight having a flat contact surface was dropped at a height of 50 cm, followed by measuring a length of crack of the film at the folded portion.

0–10 mm: o
10–20 mm: Δ
over 20 mm: x (4) Corrosion resistance: A test piece whose film is made with a cut in the form of "x" is treated in a 1% salt solution at 125° C. for 30 minutes to judge a degree of corrosion at or near the "x"-marked portion.

No change: o
Slight degree of corrosion: Δ
Considerable degree of corrosion: x (5) Consumption of potassium permanganate: 250 ml of ion-exchanged water was filled in an interiorly coated can and the can was rolled up, followed by treating under conditions of 60° C.–30 minutes and 100° C.–30 minutes and collecting 100 ml of the treated solution in an Erlenmeyer flask. 5 ml of sulfuric acid diluted with water to 1:3 and 10 ml of a 0.01N potassium permanganate solution were added to the collected solution, which was boiled for 5 minutes. Immediately, 10 ml of a 0.01N sodium oxalate solution was added for decoloration and was then titrated with a 0.01N potassium permanganate solution until slight red remained without disappearance. Similarly, a blank test was separately conducted to determine a consumption according to the following equation.

$$\text{Consumption (ppm)} = \frac{(a - b) \times 1000}{100} \times 0.316$$

in which
a: an amount of titration of the 0.01N potassium permanganate solution used in the test,
b: an amount of titration of the 0.01N potassium permanganate solution in the blank test.

(6) Amount of iron pick-up after denting: 250 ml of a 1% salt solution was filled in interiorly coated cans, and each can was rolled up. Fifty cans were placed in corrugated board box capable of accommodating 30 cans and vibrated for 5 hours in a vibrator so that the cans came into collision with one another, followed by keeping at 25° C. for one month. The tested cans were each opened and an amount of iron pick up in the salt solution was measured by the atomic absorption spectroscopy. (n: average of 15 measurements).

(7) Flavor Retentivity: 250 ml of ion-exchanged water was filled in interiorly coated cans, and each can was rolled up, followed by sterilization at 100° C. for 30 minutes and storing at 50° C. for 6 months. Thereafter, the solution in each can was subjected to a flavor test.

No change: o
Slight changes: Δ
Considerable changes: x

TABLE I

| Test Items Baking Temp. | | Adherence | | Retorting Resistance | | Flexibility | | Corrosion Resistance | |
|---|---|---|---|---|---|---|---|---|---|
| | | 165° C. | 200° C. | 165° C. | 200° C. | 165° C. | 200° C. | 165° C. | 200° C. |
| Example | 1 | 100/100 | 100/100 | o | o | o | o | o | o |
| | 2 | 100/100 | 100/100 | o | o | o | o | o | o |
| | 3 | 100/100 | 100/100 | o | o | o | o | o | o |
| | 4 | 100/100 | 100/100 | o | o | o | o | o | o |
| | 5 | 100/100 | 100/100 | o | o | o | o | o | o |
| | 6 | 100/100 | 100/100 | o | o | o | o | o | o |
| | 7 | 100/100 | 100/100 | o | o | o | o | o | o |
| | 8 | 100/100 | 100/100 | o | o | o | o | o | o |
| | 9 | 100/100 | 100/100 | o | o | o | o | o | o |
| Comparative Example | 1 | 100/100 | 100/100 | Δ | o | o | o | x | Δ |
| | 2 | 100/100 | 100/100 | o | o | o | o | o | o-Δ |
| | 3 | 100/100 | 100/100 | o | o | o | o | o | o |

TABLE II

| Test Items Baking Temp. | | Consumption of Potassium Permanganate (ppm) | | Amount of iron pick-up after denting (ppm) | | Flavor Retentivity | |
|---|---|---|---|---|---|---|---|
| | | 165° C. | 200° C. | 165° C. | 200° C. | 165° C. | 200° C. |
| Example | | | | | | | |
| | 1 | 1.2 | 0.9 | 0.2 | 0.2 | o | o |
| | 2 | 1.2 | 0.9 | 0.2 | 0.2 | o | o |
| | 3 | 1.5 | 1.0 | 0.2 | 0.2 | o | o |
| | 4 | 1.2 | 0.8 | 0.2 | 0.2 | o | o |
| | 5 | 1.1 | 0.8 | 0.2 | 0.1 | o | o |
| | 6 | 1.2 | 0.9 | 0.2 | 0.2 | o | o |
| | 7 | 3.5 | 1.4 | 0.3 | 0.2 | o | o |
| | 8 | 1.3 | 0.9 | 0.2 | 0.2 | o | o |
| | 9 | 1.3 | 0.9 | 0.2 | 0.2 | o | o |
| Comparative Example | | | | | | | |
| | 1 | 1.1 | 0.9 | 6.4 | 2.2 | o | o |
| | 2 | 5.2 | 2.8 | 0.5 | 0.3 | o | o |
| | 3 | 12.3 | 8.3 | 0.3 | 0.3 | o | o |

What is claimed is:

1. An aqueous resin dispersion prepared by dispersing a composite resin composition in an aqueous medium in the presence of ammonia or an amine in such an amount that the resulting final composition has a pH of 4 to 11, the composite resin composition comprising carboxylic groups in an excessive amount and a reaction product obtained by at least partially reacting an acrylic resin (A) having 12–70 wt.% of monobasic carboxylic acid monomer units as an essential component, an aromatic epoxy resin (B) having 1.1 to 2.0 epoxy groups on the average in the molecule and a phenolic resin (C) whose main constituent is substantially represented by the following formula

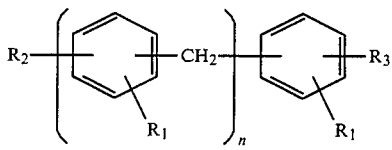

wherein $R_1$ is a hydrogen atom or an alkyl group having from 1 to 12 carbon atoms, $R_2$ and $R_3$ are each a hydrogen atom or a methylol group, and n is an integer of from 1 to 3,
   characterized in that the acrylic resin (A) and the aromatic epoxy resin (B) are at least partially reacted with each other, and the phenolic resin (C) is pre-condensed with at least one member selected from the acrylic resin (A) and the aromatic epoxy resin (B).

2. An aqueous resin dispersion according to claim 1, wherein said composite resin composition is one prepared by pre-condensing a partial reaction product (D) of said acrylic resin (A) and said aromatic epoxy resin (B) with said phenolic resin (C).

3. An aqueous resin dispersion according to claim 2, wherein said partial reaction product (D) is a partial reaction product which is in excess of carboxyl groups and is obtained by partial reaction between said acrylic resin (A) and said aromatic epoxy resin (B) in the presence of an amine catalyst or in the absence of any catalyst.

4. An aqueous resin dispersion according to claim 2 wherein a weight ratio, as solids, between said acrylic resin (A) and said aromatic epoxy resin (B) is in the range of 2:1 to 1:6.

5. An aqueous resin dispersion according to claim 4, wherein the weight of said phenolic resin (C) is in the range of from 2 to 40 wt.% of the total weight of the resins used.

6. An aqueous resin dispersion according to claim 2 wherein said acrylic resin (A) has a weight average molecular weight of from 3000 to 80000.

7. An aqueous resin dispersion according to claim 1, wherein said composite resin composition, which is in excess of carboxyl groups, is obtained by preliminary condensation of said acrylic resin (A) and said phenolic resin (C), and then partial reaction between the resulting pre-condensate and said aromatic epoxy resin (B).

8. An aqueous resin dispersion according to claim 1, wherein said composite resin composition, in excess of carboxyl groups, is obtained by preliminary condensation of said aromatic epoxy resin (B) and said phenolic resin (C), and then partial reaction between the resulting pre-condensate having the epoxy groups and said acrylic resin (A).

9. An aqueous resin dispersion according to claim 1 wherein said aromatic epoxy resin (B) has a number average molecular weight of not smaller than 900.

10. An aqueous resin dispersion comprising a composite resin composition which is in excess of carboxylic groups and which is a mixture of a partial reaction product (D) of an acrylic resin (A) having, as an essential component, 12 to 70 wt.% of monobasic carboxylic acid monomer units and an aromatic epoxy resin (B) having, on average, 1.1 to 2.0 epoxy groups in one molecule thereof, with a phenolic resin (C) comprising a principal component of the following formula

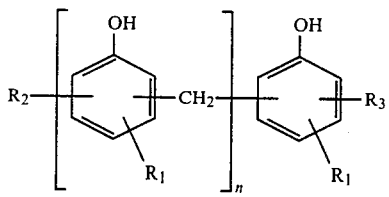

in which $R_1$ represents a hydrogen atom or an alkyl group having from 1 to 12 carbon atoms, $R_2$ and $R_3$ each represent a hydrogen atom or a methylol group, and n is an integer of from 1 to 3, said composite resin composition being dispersed in an aqueous medium in the presence of ammonia or an amine in an amount sufficient to allow the resulting final composition to have a pH of 4–11.

11. An aqueous resin dispersion according to claim 10, wherein said partial reaction product (D) is in excess of carboxyl groups and is obtained by partial reaction between said acrylic resin (A) and said aromatic epoxy resin in the presence of an amine catalyst or in the absence of any catalyst.

12. An aqueous resin dispersion according to claim 11, wherein a weight ratio, as solids, between said acrylic resin (A) and said aromatic epoxy resin (B) is in the range of from 2:1 to 1:6.

13. An aqueous resin dispersion according to claim 11 wherein said acrylic resin (A) has a weight average molecular weight of from 3000 to 80,000.

14. An aqueous resin dispersion according to claim 10 wherein the weight of said phenolic resin (C) is in the range of from 2 to 40 wt.% of the total weight of the resins used.

15. An aqueous resin dispersion according to claim 10 wherein said aromatic epoxy resin (B) has a number average molecular weight of not smaller than 900.

* * * * *

UNITED STATES PATENT AND TRADEMARK OFFICE
CERTIFICATE OF CORRECTION

PATENT NO. : 4,579,888
DATED : April 1, 1986
INVENTOR(S) : Yasushi Kodama, et al It is certified that error appears in the above-identified patent and that said Letters Patent are hereby corrected as shown below:

Column 15 lines 52 through 58: correct the formula appearing therein to read:

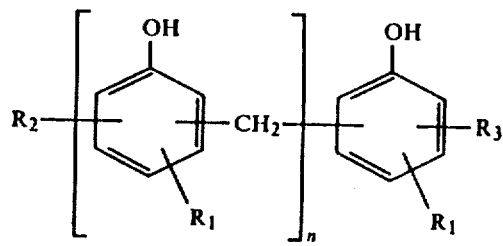

Signed and Sealed this

Fourteenth Day of October, 1986

[SEAL]

Attest:

DONALD J. QUIGG

Attesting Officer    Commissioner of Patents and Trademarks